(12) United States Patent
Dragic

(10) Patent No.: US 7,577,178 B2
(45) Date of Patent: Aug. 18, 2009

(54) NARROW LINEWIDTH INJECTION SEEDED Q-SWITCHED FIBER RING LASER BASED ON A LOW-SBS FIBER

(76) Inventor: Peter Dragic, 1307 Bluegrass, Champaign, IL (US) 61821

( * ) Notice: Subject to any disclaimer, the term of this patent is extended or adjusted under 35 U.S.C. 154(b) by 0 days.

(21) Appl. No.: 11/656,812

(22) Filed: Jan. 23, 2007

(65) Prior Publication Data

US 2008/0175278 A1    Jul. 24, 2008

(51) Int. Cl.
*H01S 3/083* (2006.01)
*H01S 3/11* (2006.01)
*H01S 3/30* (2006.01)

(52) U.S. Cl. ............... 372/94; 372/6; 372/10
(58) Field of Classification Search ............ 372/94, 372/10, 6
See application file for complete search history.

(56) References Cited

U.S. PATENT DOCUMENTS

| | | | | |
|---|---|---|---|---|
| 5,084,880 A | * | 1/1992 | Esterowitz et al. | 372/6 |
| 5,303,318 A | * | 4/1994 | Tateda et al. | 385/123 |
| 5,671,075 A | * | 9/1997 | Ramachandran et al. | 398/147 |
| 5,737,109 A | * | 4/1998 | Goodwin | 398/197 |
| 6,304,362 B1 | * | 10/2001 | Zheludev et al. | 359/241 |
| 6,535,315 B1 | * | 3/2003 | Way et al. | 398/182 |
| 6,856,723 B1 | * | 2/2005 | Ito et al. | 385/27 |
| 6,901,087 B1 | * | 5/2005 | Richardson et al. | 372/20 |
| 7,372,880 B2 | * | 5/2008 | Jablonski et al. | 372/30 |
| 2003/0086174 A1 | * | 5/2003 | Wakisaka et al. | 359/566 |
| 2004/0096170 A1 | * | 5/2004 | Papen et al. | 385/123 |
| 2004/0114641 A1 | * | 6/2004 | Wise et al. | 372/6 |
| 2004/0179783 A1 | * | 9/2004 | Switzer et al. | 385/40 |
| 2006/0133432 A1 | * | 6/2006 | Dragic | 372/6 |
| 2007/0116416 A1 | * | 5/2007 | Chen et al. | 385/123 |
| 2007/0196062 A1 | * | 8/2007 | Inoue et al. | 385/123 |
| 2008/0175279 A1 | * | 7/2008 | Kakui | 372/10 |

* cited by examiner

*Primary Examiner*—Minsun Harvey
*Assistant Examiner*—Marcia A. Golub
(74) *Attorney, Agent, or Firm*—Carmen Patti Law Group, LLC

(57) ABSTRACT

A narrow linewidth injection-seeded Q-switched fiber ring laser based on a low-SBS optical fiber. High peak powers are achieved through the use of a single-clad erbium doped fiber with an acoustic waveguide. 12.5 μJ per pulse (250ns pulse width) is achieved before a weakened form of stimulated Brillouin scattering appears. This laser has the potential to scale to very high power in a low-SBS dual clad fiber.

5 Claims, 4 Drawing Sheets

NARROW LINEWIDTH INJECTION SEEDED Q-SWITCHED FIBER RING LASER BASED ON A LOW-SBS FIBER

RELATED APPLICATIONS

The present application claims priority to Provisional Application No. 60/761,152, filed Jan. 23, 2006.

BACKGROUND OF THE INVENTION

Fiber lasers have become very attractive for use in lidar applications. This is due to a number of superior parameters that are characteristic of these lasers, namely high efficiency, small size, and low weight, making them especially suitable for space applications. Many lidar applications, such as differential absorption (DIAL) and resonance fluorescence, require narrow linewidth operation of the fiber laser. For example, the remote detection of $CO_2$ could be facilitated by narrow linewidth erbium-doped fiber lasers due to the presence of a strong absorption feature near 1572 nm that resides in the Er L-Band.

In pulsed mode however, these systems are ravaged by Stimulated Brillouin Scattering (SBS), which substantially limits the peak power available for narrow linewidth systems. Considering the low duty cycles required for a traditional pulsed lidar transmitter ($\sim 1/1000$), SBS substantially limits total average power resulting in degraded system signal-to-noise ratio (SNR) leading to the requirement of long and usually impractical integration times. As a result, the suppression of SBS in fiber lasers would enable a number of new lidar configurations and applications.

SUMMARY OF THE INVENTION

The invention comprises a narrow linewidth, 12.5 µJ-per-pulse (250 ns pulse width), injection seeded, Q-switched fiber ring laser based on a low-SBS fiber.

BRIEF DESCRIPTION OF THE DRAWINGS

Reference will be made to the drawings, wherein.

DETAILED DESCRIPTION OF THE DRAWINGS

Figure 1:
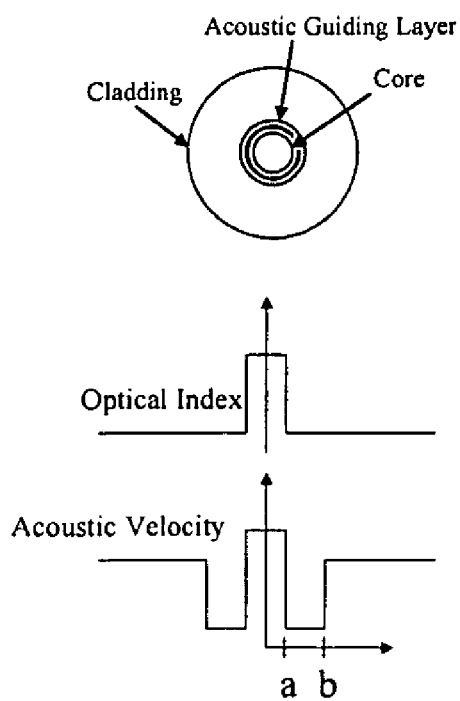
FIG. 1 of the drawings is a cross-sectional view of the low SBS optical fiber. An acoustic waveguide surrounds the core to cause a decrease in the effective Brillouin gain coefficient. Both the optical and acoustic index profiles are provided.

While this invention is susceptible of embodiment in many different forms, there is shown in the drawings and described herein in detail specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

SBS is a well-known interaction between an acoustic wave and the optical field in fiber. In general, the scattering amplitude can be found from a volume integral $$D_{p,q} = \int_{Vol} \vec{E}_p^* \delta\vec{\varepsilon}_{p,q} \vec{E}_{iq} dV$$

where $p,q = r,\phi,z$ are the cylindrical coordinates, $\vec{E}$ is the electric field and $\delta\vec{\varepsilon}$ are the dielectric perturbations resulting from the acoustic strain. Taking the optical field component $E_z$ to be zero in the fiber, the non-zero contributions to the scattering amplitude are $D_{rr}$, $D_{\phi\phi}$, and $D_{r\phi}$ ($=D_{\phi r}$). The relevant dielectric perturbations ($\delta\vec{\varepsilon}_{p,q}$) are functions of the acoustic strain fields ($S_{p,q}$) and are expressed as $$\delta\varepsilon_{rr} = -\varepsilon_0 n^4 (p_{11}S_{rr} + p_{12}S_{\phi\phi} + p_{12}S_{zz})$$

$$\delta\varepsilon_{\phi\phi} = -\varepsilon_0 n^4 (p_{11}S_{\phi\phi} + p_{12}S_{rr} + p_{12}S_{zz})$$

$$\delta\varepsilon_{\phi r} = -\varepsilon_0 n^4 2 p_{44} S_{\phi r},$$

where n is the index of refraction and $\varepsilon_0$ is the permittivity of free space. The photoelastic constants, p, for vitreous silica at $\lambda=632.8$ nm as $p_{11}=0.121$, $p_{12}=0.271$, and $p_{44}=-0.075$. The generalized form of the acoustic strain field can be written in Cartesian coordinates as a function of the displacement vector $\overline{u}$ $$S_{ij} = \frac{1}{2}\left(\frac{\partial u_j}{\partial r_i} + \frac{\partial u_i}{\partial r_j}\right).$$

In general, the components of $\overline{u}$ are coupled and can be found from a generalized damped acoustic wave equation, $$\rho \ddot{u} - \nabla \cdot [\overline{c}\nabla u + \overline{\eta}\nabla\dot{u}] = -\frac{1}{2}\nabla \cdot [\overline{\gamma}E_k E_l]$$

where ρ is the mass density, the electrostrictive coefficients are given by a fourth rank tensor in $\overline{\gamma}$, and the damping term $\overline{\eta}$ is a tensor of rank four. Finally, $\overline{c}$ is the rank-four elastic modulus tensor. A damped wave equation is needed since at the acoustic frequencies involved in SBS (~10 GHz), the acoustic wave is heavily damped. To determine the acoustic eigenmodes of an acoustically guiding fiber, sixth equation is solved subject to the typical boundary conditions: both the force and displacement, both normal and tangential to the fiber interfaces are continuous.

However, it has been shown that in the SBS interaction, the dominant displacement vector component is $u_z$. This makes sense since SBS is known to result from a longitudinally varying acoustically-induced Bragg grating. Furthermore, the analysis in showed that $D_{rr}$ is the dominant scattering amplitude.

As a result, several assumptions can be made to simplify the mathematical analysis; 1) the components of $\bar{u}$ are decoupled from each other and from the optical field; 2) the acoustic wave is un-damped; and 3) the shear velocity and mass density are constant in the radial direction ($V^s_{core} \approx V^s_{cladding}$ and $\rho_{core} \approx \rho_{cladding}$). For an acoustically guiding optical fiber, this leads to a set of solutions for $\bar{u}$ known as 'Leaky' longitudinal modes, designated $L_{nm}$, with $u_z$ being the dominant component.

A traditional single mode fiber (i.e. Ge-doped core and pure silica cladding) is an acoustic waveguiding fiber. Interestingly, the dispersion relationship for the leaky acoustic modes in this fiber is identical to that of the guided optical modes. Furthermore, the $L_{01}$ leaky mode dominates the SBS process due to a large scattering integral in the first equation. This is a direct consequence of a high spatial overlap with the optical mode. This makes sense since both the fundamental optical and acoustic modes are defined by a Bessel function of the first kind (J) in the core and modified Bessel function of the second kind (K) in the cladding.

Therefore, our first order approach to the suppression of SBS in optical fiber is the removal of the high spatial overlap with the fundamental mode, thereby introducing a significant decrease in the effective Brillouin gain coefficient. Our approach is the inclusion of an additional acoustic waveguide layer to remove the Bessel-J functional form at the center of the fiber. A cross-sectional view of the optical fiber is provided in FIG. 1.

In this fiber, the $L_{0m}$ acoustic eigenmodes are therefore represented by the usual Bessel functions $$u_z = \begin{cases} A_0 I_0\left(u_1 \frac{r}{a}\right) & r \leq a \\ A_1 J_0\left(u_2 \frac{r}{b}\right) + A_2 Y_0\left(u_2 \frac{r}{b}\right) & a < r \leq b \\ A_3 K_0\left(u_3 \frac{r}{b}\right) & r > b \end{cases}$$

with $$\begin{cases} u_1 = 4\pi a \frac{n_{opt}}{\lambda_{opt}} V_a \left(\frac{1}{V_a^2} - \frac{1}{V_1^2}\right)^{1/2} \\ u_2 = 4\pi b \frac{n_{opt}}{\lambda_{opt}} V_a \left(\frac{1}{V_2^2} - \frac{1}{V_a^2}\right)^{1/2} \\ u_3 = 4\pi b \frac{n_{opt}}{\lambda_{opt}} V_a \left(\frac{1}{V_a^2} - \frac{1}{V_3^2}\right)^{1/2} \end{cases}$$

where $n_{opt}$ is the index of refraction of the optical mode and $\lambda_{opt}$ is the vacuum optical wavelength. $V_1$, $V_2$, and $V_3$ are the acoustic velocities (km/s) in the core, acoustic waveguide layer, and cladding, respectively. It is clear from the seventh equation that the overlap with the $L_{01}$ fundamental leaky acoustic mode can be substantially degraded.

To determine the acoustic eigenmodes $V_a$, we match the boundary conditions and solve the following determinant expression $$\begin{vmatrix} I_0(u_1) & -J_0\left(u_2 \frac{a}{b}\right) & -Y_0\left(u_2 \frac{a}{b}\right) & 0 \\ \frac{u_1}{a} I_1(u_1) & \frac{u_2}{b} J_1\left(u_2 \frac{a}{b}\right) & \frac{u_2}{b} Y_1\left(u_2 \frac{a}{b}\right) & 0 \\ 0 & J_0(u_2) & Y_0(u_2) & -K_0(u_3) \\ 0 & -\frac{u_2}{b} J_1(u_2) & -\frac{u_2}{b} Y_1(u_2) & \frac{u_3}{b} K_1(u_3) \end{vmatrix} = 0.$$

The eigenfrequencies are then found by taking $V_a/\lambda_a$ where the acoustic wavelength is determined by the Bragg condition $\lambda_{opt}/2n_{opt}$. To determine the scattering amplitude in the first equation, the normalized acoustic mode is needed, and therefore the coefficients A in the seventh equation are similarly found by matching the boundary conditions.

For silica glass, it is well known that Ge and P dopants both act to decrease the acoustic velocity and increase the index of refraction. B and F also decrease the acoustic velocity, but act to decrease the index of refraction. Al increases the acoustic velocity while increasing the index. As a result, there are sufficient degrees of freedom with the most common fiber dopants to achieve the profiles shown in FIG. 1.

A single-clad Er-doped optical fiber was produced (Neolight Labs model 111-001 low-SBS fiber) doped with 6.0 mol % $Al_2O_3$, 0.1 mol % $P_2O_5$ and $GeO_2$, and 0.2 mol % F in the core, 4.0 mol % $GeO_2$ and 1.9 mol % F in the acoustic layer, and a pure silica cladding. These values are provided for the center of each layer, since the profiles were super-Gaussian in shape, as opposed to the ideal profiles shown in FIG. 1. The fiber has the dimensions a=2.2 μm and b=6.0 μm with single-mode cutoff wavelength around 950 nm. The Er doping concentration is 1000 ppm/wt. The acoustic layer has an index of refraction matched to that of the cladding, although this is not a necessary condition.

Figure 2:
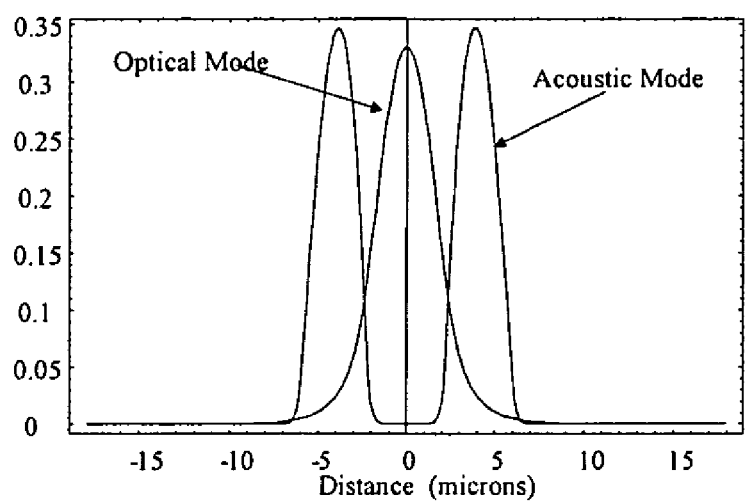
FIG. 2 of the drawings are plots of the fundamental optical mode at 1550nm and excited L01 acoustic mode demonstrating the low spatial overlap.

The resulting acoustic velocities were estimated to be 6073 m/s, 5322 m/s, and 5933 m/s in the core, acoustic layer, and cladding, respectively. The resulting $L_{01}$ leaky longitudinal acoustic mode is calculated to have an acoustic velocity of 5.33 km/s. FIG. 2 provides a plot of the normalized acoustic mode (amplitude) and optical mode (intensity) demonstrating the successful removal of the $L_{01}$ acoustic mode as a dominant mode.

Interestingly, as a result of the super-Gaussian doping profile resulting from the fiber manufacture, SBS interacts most significantly with the wide guided-acoustic mode tails of high order modes that extend deeply into the core from the acoustic layer.

Figure 3:
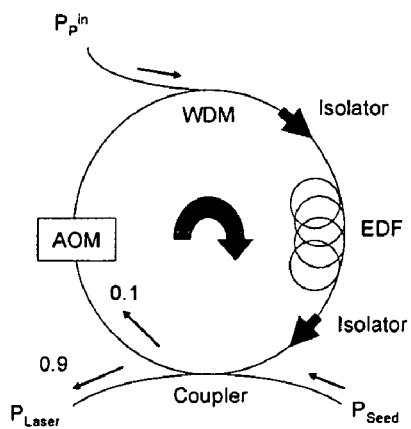
FIG. 3 of the drawings is a basic laser block diagram. An output coupler with a split ratio of κ is employed. Laser direction is clockwise.

FIG. 3 shows the basic laser setup in which a 20 m length of the Er-doped fiber (EDF) is employed. This fiber has a measured effective Brillouin gain coefficient ($g_B$) of less than $0.5 \times 10^{-11}$ m/W. Two isolators are used to ensure unidirectional laser operation (clockwise in FIG. 2). Pump light (976 nm) is coupled into the ring using a wavelength division multiplexer (WDM). The 90% arm of a 90/10 2×2 coupler is used as the laser output. The coupler input forms part of the ring. Seed power is launched into the other input arm of the coupler, providing 90% injection efficiency into the ring. We used a fiber coupled pulse modulated acoustooptic modulator (AOM) [Brimrose Corp.] as the Q-switch and an isolated Agilent 81682A external cavity diode laser (ECDL) provided seeding. The AOM had a maximum diffraction efficiency of about 50% and insertion loss of about −3 dB. The linewidth of the ECDL was measured using a self-heterodyne technique to be about 85 kHz. The output power of the ring was measured using a broad area Ge detector, and the pulses were analyzed using a fast InGaAs APD.

The peak passband wavelength of the AOM was ~1531 nm (with ~25 nm width) when operated at an acoustic frequency of 106 MHz. Thus, we employed a seed wavelength of 1531 nm. To achieve other wavelengths, such as 1572 nm for the $CO_2$ application, the AOM should be optimized for the desired wavelength range. Furthermore, intracavity filters would aid in L-band laser operation.

Injection seeding is normally considered to be a narrow linewidth operation and can be a very difficult process. For effective seeding to take place, the seed wavelength should be well-aligned to a cavity mode and have a linewidth less than that of a ring mode. However, in the case of a low-finesse cavity, this requirement is substantially relaxed since the cavity modes overlap forming a quasi-continuum. The finesse of the ring cavity of FIG. 3 is estimated to be ~2.

Figure 4:
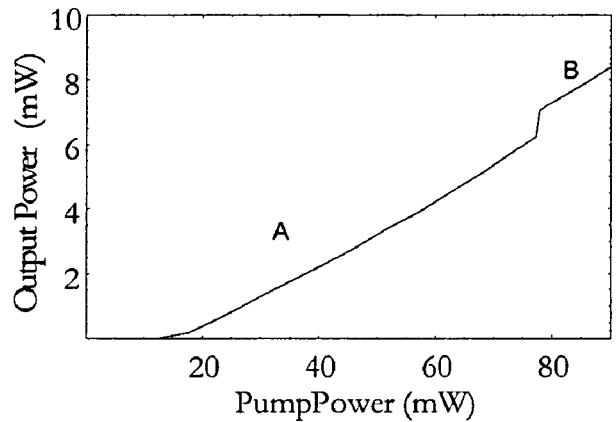
FIG. 4 of the drawings is a L-I curve for the ring laser. The laser was seeded with 6 mW of power at 1531 nm. The Q-switch operated at 500 Hz and was open for 1 µs.
Figure 5:
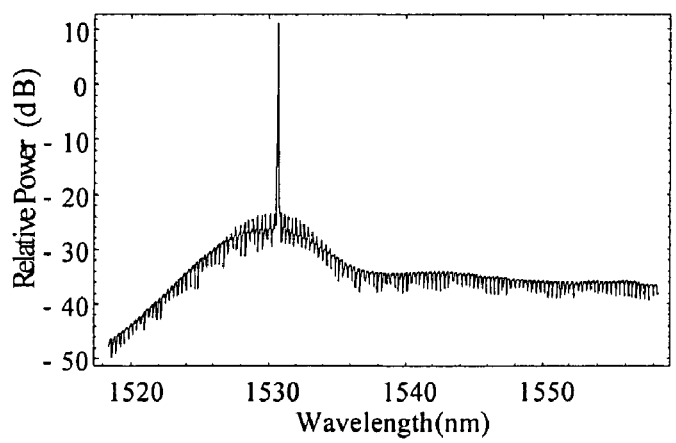
FIG. 5 of the drawings is an optical spectrum of the Q-switched ring laser at 75 mW of pump power. ASE noise is very low.

FIG. 4 provides an L-I curve for the injection seeded ring laser. The ring was operated at 500 Hz and the Q-switch was open for 1 μs, with $P_{seed}$=6 mW. When no pump power is present, some seeder leakage is present at the output, which we subtracted from the L-I curve. We see that over 6 mW of average output power was produced by the ring laser. This is an order-of-magnitude improvement in average output power relative to a fiber with an identical length and mode field diameter (MFD) with no SBS suppression. Furthermore, ASE noise from the ring was found to be very low. FIG. 5 shows a pulsed-mode optical spectrum of the laser.

The L-I curve has two distinct operating regions, labeled in FIG. 4 as A and B. In region A, normal seeded operation of the laser is observed. A sharp transition into region B is observed at about 77 mW of pump power, where SBS first appears in the laser.

Figure 6:
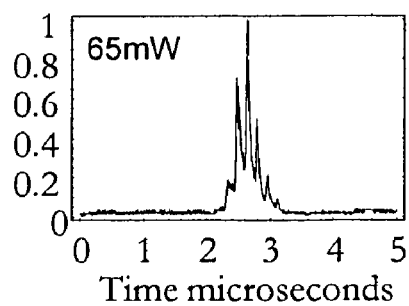
FIG. 6 of the drawings are output pulses at 65 mW, 75 mW, and 85 mW of pump power. SBS appears in Region B, beyond about 77 mW of pump power.
Figure 6:
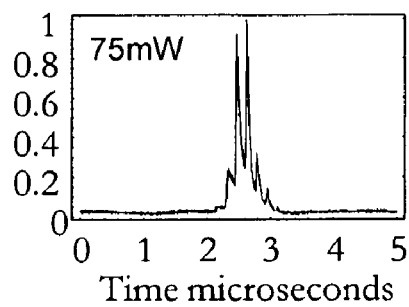
Figure 6:
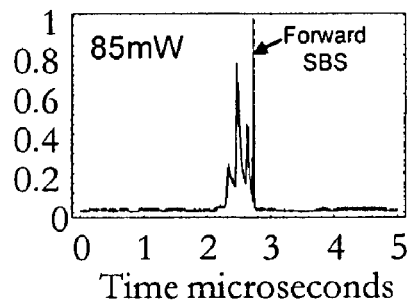

To explain laser operation, FIG. 6 shows the output pulses at 65 mW, 75 mW, and 85 mW of pump power. Characteristic of all of the pulses is the comb-like shape due to the round trip time in the ring cavity (150 ns, 30 meter total ring length). It also is observed that the pulses narrow and the peaks sharpen as the pump power is increased.

A unique feature regarding the performance of this laser is the effect when SBS appears. SBS appears as the laser transitions from operating zone A to zone B. In a previously known laser, this resulted in an initial drop in forward output power. In this case, however, it causes an immediate increase in forward power. It is conjectured that since the peak power is so high in the last few meters of the Er-doped fiber, secondary SBS is immediately excited. This results in increased energy extraction efficiency in the forward direction, thereby giving rise to the increase in power at the onset of SBS.

Figure 7:
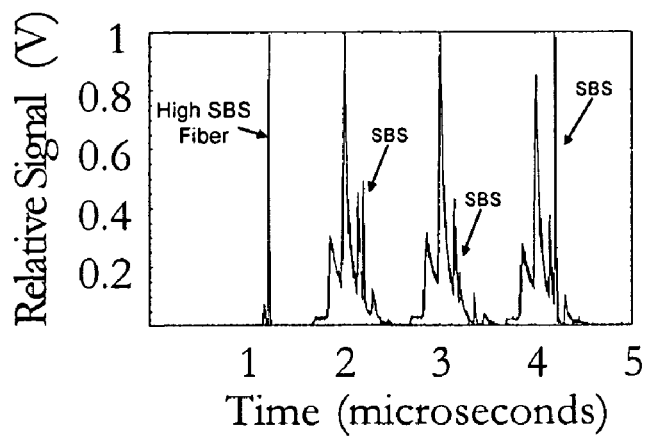
FIG. 7 of the drawings are secondary-SBS pulse shape from [15], and three random pulse shapes from the low-SBS ring laser at 100 mW of pump power.

We can justify that SBS is causing the transition between zones B and C by the observation that at around 77 mW of pump power, the backside of the output pulse (third peak from the left at about 2.6 μs) 'flickers' in-and-out, consistent with an SBS back-reflection. There also appears to be a small second-order SBS signal that appears in the forward direction. Both of these phenomena can be seen in FIG. 7 where three random pulse shapes were taken from the ring at 100 mW of pump power. However, unlike the prior art, the laser does not lock into an SBS-dominated pulse shape, represented in FIG. 7 as "high SBS fiber." Instead, the forward SBS component simply flickers weakly and the output pulse shape seen in FIG. 6 is the same for all pump powers up to a maximum available 150 mW. This suggests that besides an increased SBS threshold, the SBS interaction itself has been substantially weakened, such that most of the available energy is extracted from the laser before SBS can dominate laser operation.

Figure 8:
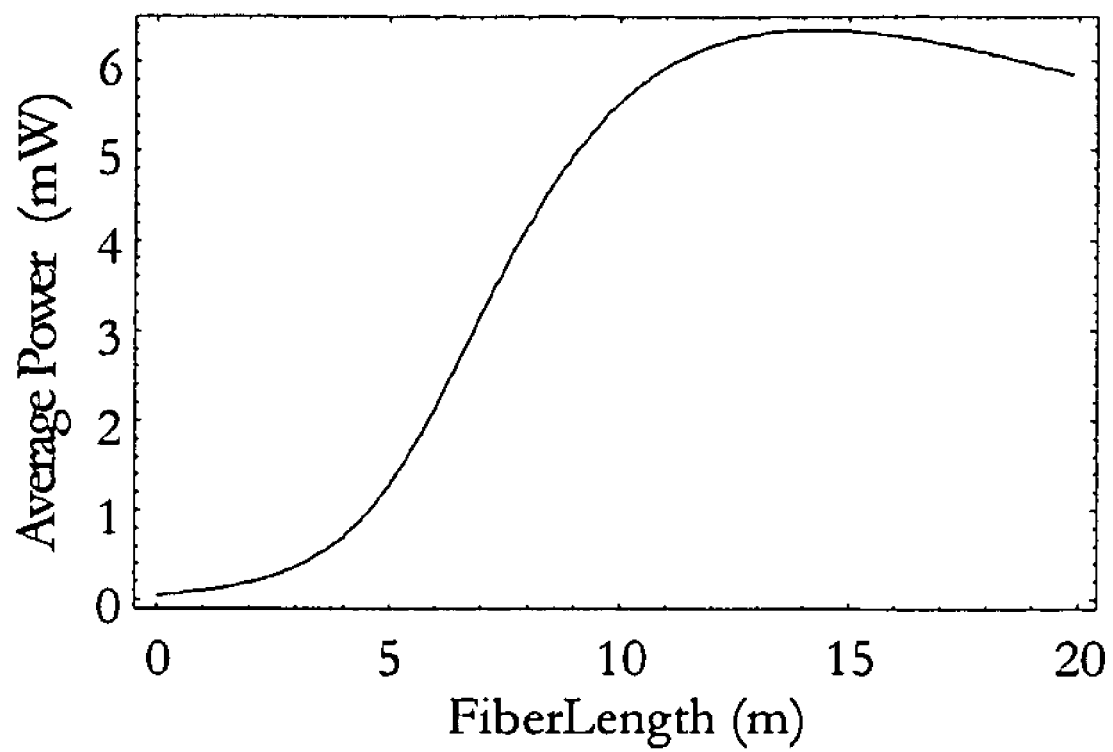
FIG. 8 of the drawings are laser power distribution in the EDF multiplied by the coupler ration (0.9) using the theory in [17].

The SBS threshold of the fiber ring laser can be estimated. The distribution of average laser power along the fiber length (multiplied by the output coupler ratio 0.9) is modeled in FIG. 8, using the spectroscopic parameters found in W. J. Miniscalco, "Erbium-Doped Glasses for Fiber Amplifiers at 1500 nm," *J. Lightwave Technol.*, vol. 9, no. 2, pp. 234-250, February 1991, for a pumping wavelength at the peak of the 980 nm (75 mW) band and laser wavelength of 1531 nm. It is clear from the graph that 20 m of fiber is not an optimal length, but it enables a comparison with prior art employing an identical fiber with no SBS suppression. Further improvements in power can be achieved by shortening the Er-fiber length, both in raw power (albeit only slightly) and SBS threshold.

Assuming an effective fiber length of 10 m (z=10 to 20 meters in FIG. 8), and using $g_B$=5.0×10$^{-11}$ m/W for bulk fused silica (polarized value) and a MFD of about 7 μm at 1530 nm, we can estimate the SBS threshold to be about 2 W, peak, in a fiber with no SBS suppression. This is consistent with the maximum output power measured in the prior art for an identical fiber length and MFD, and no SBS suppression. The use of the polarized value for the gain coefficient is justified here since the seeder is linearly polarized and the signal and Stokes' waves' polarizations remain well-correlated throughout the short fiber length.

The FWHM of the envelope of the output pulse at 75 mW of pump power is roughly 250 ns. This corresponds to a peak power of about 50 Watts. Much of this high peak power can be attributed to the low effective Brillouin gain coefficient of the Er-doped fiber, at more than an order-of-magnitude lower than the bulk value. However, the laser also gains in SBS threshold from two additional advantages to the configuration in FIG. 3.

First, the comb-like peaks sharpen and narrow as the pump power is increased, so that the overall pulse shape consists of a few sub-pulses (~100 Watts peak). The width (FWHM) of each of these sub-pulses is ~40 ns at 75 mW of pump power, representing an interaction length of about 4 m, or substantially less than the 20 m of Er-doped fiber used. The sub-pulses also give rise to a slight spectral broadening (~9.4 MHz if transform-limited Gaussian sub-pulses are assumed), offering a slight further increase in the SBS threshold. Second, since the AOM in the cavity imparts a frequency shift of 106 MHz each time around the ring, each of the sub-pulses are separated by 106 MHz. Since this shift falls outside the Brillouin gain spectrum, there is no SBS averaging effect observed from sub-pulse to sub-pulse as they make a round trip in the ring. The total shift between the sub-pulses can be controlled by the AOM frequency, but the instantaneous linewidth (of each sub-pulse) remains narrow.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A narrow-linewidth injection seeded Q-switched fiber ring laser, comprising:
a ring formed of a single-clad Er-doped optical fiber having a core, an acoustic layer, and a pure silica cladding, the core, the acoustic layer, and the pure silica cladding structured such that an $L_{01}$ acoustic mode of the optical fiber is removed as a dominant mode, the Er-doped optical fiber having a predetermined length and an effective Brillouin gain coefficient of less than $0.5 \times 10^{-11}$ m/W;

two isolators operatively coupled to the optical fiber to effect unidirectional laser operation;

a wavelength division multiplexer operatively coupled to the ring, the wavelength division multiplexer coupling pump light into the ring;

a coupler operatively coupled to the ring, the coupler having a first arm that is a laser output, the coupler forming part of the ring, and a second input arm into which seed power is launched; and a Q-switch operatively coupled to the ring.

2. The narrow-linewidth injection seeded Q-switched fiber ring laser according to claim 1, wherein the coupler is a 90/10 2×2 coupler, wherein the first input arm is a 90% input arm, and wherein the second input arm provides a 90% injection efficiency into the ring.

3. The narrow-linewidth injection seeded Q-switched fiber ring laser according to claim 1, wherein the Q-switch is a fiber coupled pulse modulated acoustooptic modulator.

4. The narrow-linewidth injection seeded Q-switched fiber ring laser according to claim 1, wherein seeding is provided to the ring by an isolated external cavity diode that is operatively coupled to the ring.

5. The narrow-linewidth injection seeded Q-switched fiber ring laser according to claim 4, wherein a seed wavelength is aligned to a cavity mode of the isolated external cavity diode and wherein the seed wavelength has a linewidth less than that of a ring mode of the ring.

* * * * *